United States Patent
Greggs

(10) Patent No.: US 10,882,568 B2
(45) Date of Patent: Jan. 5, 2021

(54) VEHICLE FRONT-END ASSEMBLY

(71) Applicant: Nissan North America, Inc., Franklin, TN (US)

(72) Inventor: Alan Greggs, Novi, MI (US)

(73) Assignee: Nissan North America, Inc., Franklin, TN (US)

(*) Notice: Subject to any disclaimer, the term of this patent is extended or adjusted under 35 U.S.C. 154(b) by 218 days.

(21) Appl. No.: 16/118,806

(22) Filed: Aug. 31, 2018

(65) Prior Publication Data

US 2020/0070895 A1   Mar. 5, 2020

(51) Int. Cl.
*B62D 25/20* (2006.01)
*B62D 21/02* (2006.01)

(52) U.S. Cl.
CPC ......... *B62D 25/2072* (2013.01); *B62D 21/02* (2013.01)

(58) Field of Classification Search
CPC .... B62D 25/2072; B62D 21/02; B62D 21/10; B60R 19/44; B60R 19/48; B60R 19/50; B60R 19/54; B60R 19/56
USPC .............................. 296/193.07; 293/112, 142
See application file for complete search history.

(56) References Cited

U.S. PATENT DOCUMENTS

| | | |
|---|---|---|
| 5,054,806 A | 10/1991 | Chester |
| 6,161,867 A | 12/2000 | Tamura |
| 8,366,170 B2* | 2/2013 | Glickman ........... B60R 13/0861 180/69.1 |
| 10,202,149 B1* | 2/2019 | Johnson ................. B62D 21/02 |

| | | |
|---|---|---|
| 2004/0090041 A1 | 5/2004 | Lenzen, Jr. et al. |
| 2005/0116435 A1* | 6/2005 | Nishiura ................. B60R 19/56 280/124.109 |
| 2008/0157547 A1* | 7/2008 | Baumann ................ B60R 19/40 293/118 |
| 2010/0143695 A1* | 6/2010 | Ogawa ...................... B32B 3/02 428/306.6 |
| 2013/0056790 A1* | 3/2013 | Kawamura ......... H01L 29/0649 257/139 |
| 2018/0037075 A1 | 2/2018 | Chang et al. |

(Continued)

FOREIGN PATENT DOCUMENTS

| | | | | |
|---|---|---|---|---|
| CN | 106741208 A | * | 5/2017 | |
| EP | 1270382 A2 | * | 1/2003 | ............ B62D 35/02 |
| JP | 08164775 A | * | 6/1996 | |

(Continued)

OTHER PUBLICATIONS

2016 Chevrolet 1500 Pickup Truck with Skid Plate (2016).

*Primary Examiner* — Hilary L Gutman
(74) *Attorney, Agent, or Firm* — Global IP Counselors, LLP

(57) ABSTRACT

A vehicle front-end assembly includes a vehicle frame and a skid plate. The vehicle frame has a first front side member and a second front side member. Each of the first and second front side members has a corresponding front-end portion with a downward facing surface. The skid plate has a main section, a first attachment flange extending from a first lateral side of the main section and a second attachment flange extending from a second lateral side of the main section. The first attachment flange is attached to the downward facing surface of the first front side member. The second attachment flange is attached to the downward facing surface of the second front side member such that the main section covers a forward area of an underside of the vehicle.

14 Claims, 12 Drawing Sheets

(56) References Cited

U.S. PATENT DOCUMENTS

2019/0009835 A1* 1/2019 D'Amico .................. F16B 5/02

FOREIGN PATENT DOCUMENTS

| KR | 20130114913 A | * | 10/2013 | | |
|----|---------------|---|---------|---|---|
| KR | 2017079149 A | * | 7/2017 | | |
| WO | WO-2007080677 A1 | * | 7/2007 | ............. | B60R 19/56 |

* cited by examiner

VEHICLE FRONT-END ASSEMBLY

BACKGROUND

Field of the Invention

The present invention generally relates to a vehicle front-end assembly. More specifically, the present invention relates to front-end assembly that includes a skid plate that attaches directly to a downward facing surface of a front side member of a vehicle frame.

Background Information

Many off-road vehicles include panels that cover forward underside areas of the vehicle. Such covers are often referred to as skid panels or skid plates. The purpose of a skid plate is to protect and shield engine components and vehicle elements located with a low area of the front-end of the vehicle from flying debris during an off-road excursion. Such skid plates are not structural elements and are typically attached to bumper and/or fender elements of the vehicle.

SUMMARY

One object of the present disclosure is to provide a vehicle with a skid plate that attaches directly to forward areas of the vehicle frame via mechanical fasteners.

In view of the state of the known technology, one aspect of the present disclosure is to provide a vehicle front-end assembly with a vehicle frame, a bumper assembly and a skid plate. The vehicle frame has a first front side member and a second front side member laterally spaced apart from one another. Each of the first and second front side members has a corresponding front-end portion with a forward-facing surface and a downward facing surface. The bumper assembly is attached to and extends between the forward-facing surfaces of the front-end portions of the first and second front side members. The skid plate has a main section, a first attachment flange extending from a first lateral side of the main section and a second attachment flange extending from a second lateral side of the main section. The first attachment flange is attached to the downward facing surface of the first front side member. The second attachment flange is attached to the downward facing surface of the second front side member such that the main section covers a forward area of an underside of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
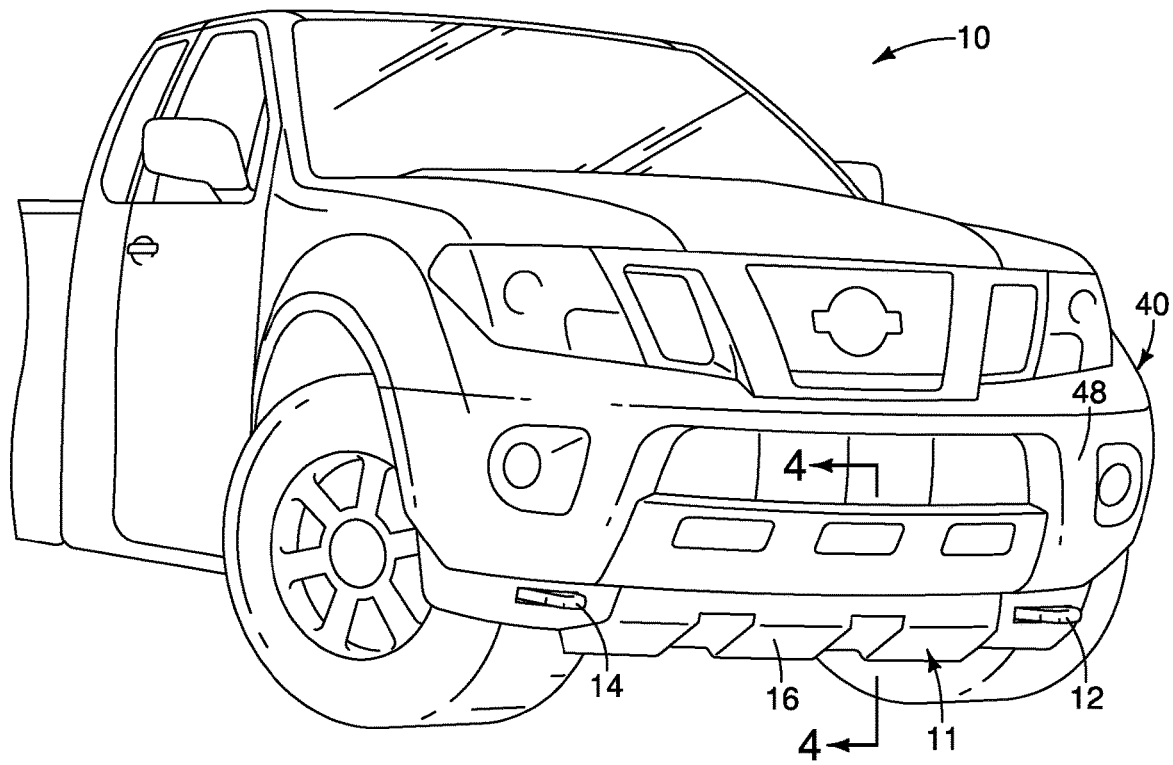
FIG. 1 is a perspective view of a front-end assembly of a vehicle that includes a first tow hook, a second tow hook and a skid plate in accordance with a first embodiment.

Referring initially to FIG. 1, a vehicle 10 that includes a front end assembly 11 that includes a first tow hook 12, a second tow hook 14 and a skid plate 16 is illustrated in accordance with a first embodiment.

The vehicle 10 is depicted as a pick-up truck. However, it should be understood from the drawings and the description herein below that the vehicle 10 can be any vehicle that has off-road drivability and/or structural design suitable for use with tow hooks, such as the first and second tow hooks 12 and 14.

The first and second tow hooks 12 and 14 are configured and designed such that a vehicle operator or passenger can connect a chain, cable or other suitable towing material to one or both of the tow hooks 12 and 14 and tow the vehicle 10 or use the vehicle 10 to tow another vehicle (not shown) out of, for example, a ditch or deep mud puddle or the like.

Figure 2:
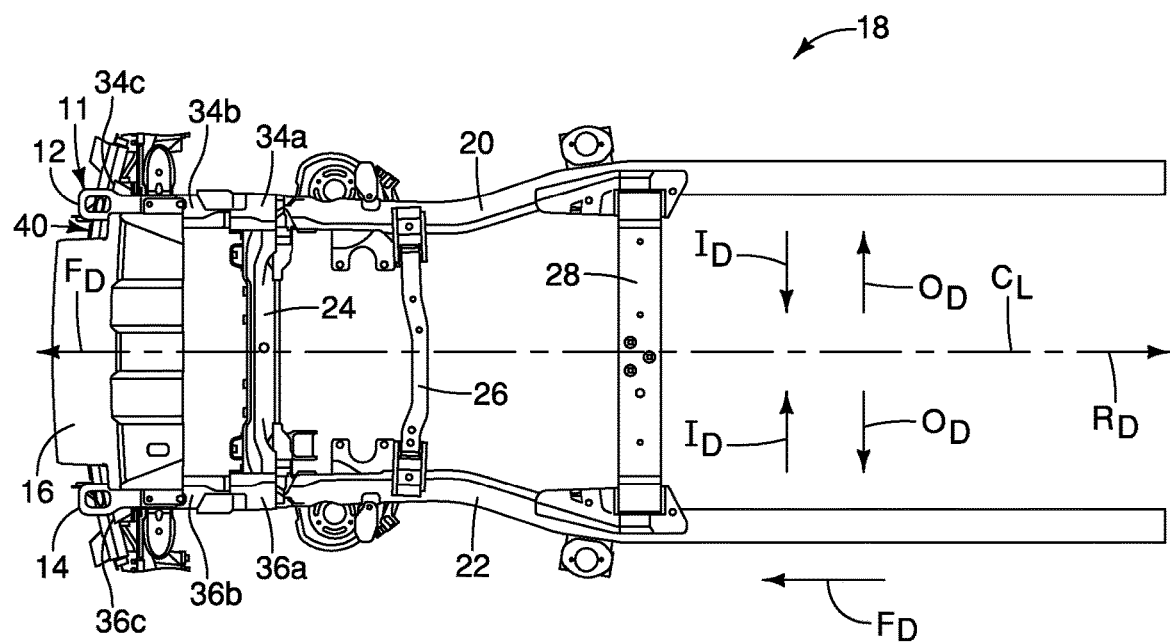
FIG. 2 is a bottom view of a vehicle frame removed from the vehicle depicted in FIG. 1, showing the first tow hook, the second tow hook and the skid plate attached to a first front side member and a second front side member in accordance with the first embodiment.

The front-end assembly 11 of the vehicle 10 includes a vehicle frame 18, such as that shown in FIG. 2. The vehicle frame 18 (sometimes referred to as a vehicle chassis) is a rigid structural assembly that usually receives and supports a vehicle body thereon. Since vehicle chassis and vehicle bodies are conventional automotive features, further description is omitted for the sake of brevity. The vehicle frame 18 is preferably made of heavy gauge steel or any suitable iron, aluminum material with rigidity and strength suitable for a vehicle with off-road capability.

The vehicle frame 18 in the depicted embodiment includes a first beam 20, a second beam 22, and a plurality of cross-members 24, 26 and 28 that extend between the first beam 20 and the second beam 22. The cross-members 24, 26 and 28 are welded or otherwise rigidly fixed to each of the first beam 20 and the second beam 22 creating the rigid vehicle frame 18. In FIG. 2, the vehicle body, engine and all other components have been removed from the vehicle frame 18, except the first tow hook 12, the second tow hook 14 and the skid plate 16, which are shown installed to the vehicle frame 18.

Figure 3:
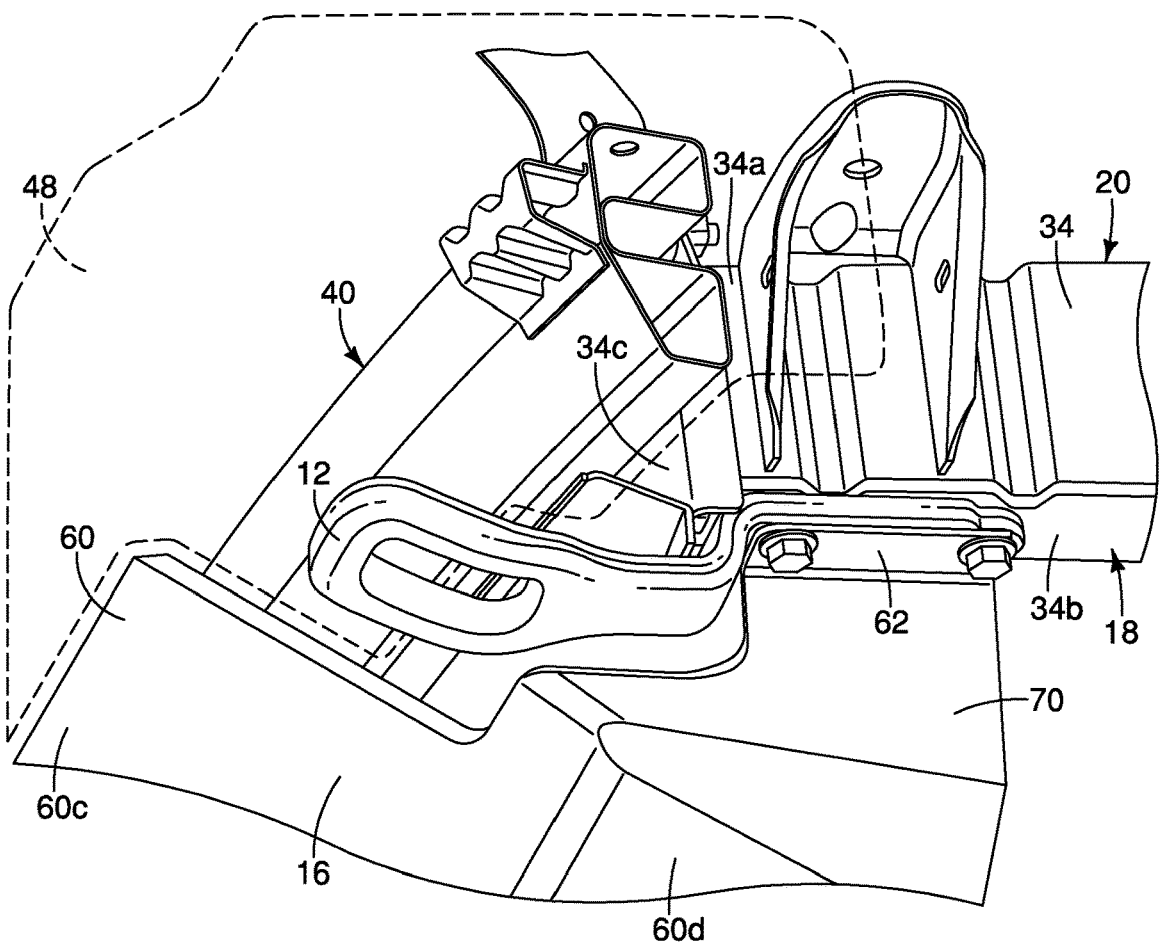
FIG. 3 is a perspective view of a portion of the front-end assembly fully assembled showing the first front side member, the first tow hook and a first attachment flange of the skid plate fixed together by a first mechanical fastener and a second mechanical fastener in accordance with the first embodiment.

A forward portion of the first beam 20 of the vehicle frame 18 defines a first front side member 34, and a forward portion of the second beam 22 of the vehicle frame 18 defines a second front side member 36. Each of the first front side member 34 and the second front side member 36 is loosely defined as that portion of the corresponding first and second beams 20 and 22 located forward from the cross-member 26. The first front side member 34 is located adjacent to a driver's side (a first lateral side) of the vehicle 10, and, the second front side member 36 is located adjacent to a passenger's side (a second lateral side opposite the first lateral side) of the vehicle 10. The first front side member 34 has a front-end portion 34a and a downward facing surface 34b (FIGS. 2 and 3). The second front side member 36 has a front-end portion 36a and a downward facing surface 36b.

The first front side member 34 and the second front side member 36 are laterally spaced apart from one another, as are the rearward portions of the first beam 20 and the second beam 22. The first front side member 34 and the second front side member 36 are identical, except that they a mirror images of one another with symmetry relative to a longitudinal center line $C_L$ that is defined by the vehicle 10 and the vehicle frame 18.

Several directions are defined relative to the vehicle frame 18, as shown in FIG. 2. Specifically, the longitudinal center line $C_L$ that extends in a lengthwise direction of the vehicle 10 along a central portion of the vehicle 10. At a left-hand side of FIG. 2, a forward direction $F_D$ is indicated by the depicted arrow, and at a right-hand side of FIG. 2 a rearward direction $R_D$ is indicated by the depicted arrow. As well, inboard directions $I_D$ and outboard directions $O_D$ relative to the longitudinal center line $C_L$ are also shown in FIG. 2.

It should be understood from the drawings and description, that the vehicle 10 can also be a vehicle with as unibody construction. A unibody vehicle is a vehicle that does not typically includes a separate frame such as the frame 18. Rather, the unibody vehicle includes various structural elements welded together. Elements of the unibody vehicle serve as frame elements functionally equivalent to the elements of the frame 18. For example, U.S. Pat. No. 8,870,267 assigned to Nissan North America, discloses a unibody vehicle both structure. The front structural support portions (30) disclosed in U.S. Pat. No. 8,870,267 also define front side members, functionally equivalent to the first and second front side member 34 and 36, as described above. The first, and second tow hooks 12 and 14, as well as the skid plate 16 described herein can alternatively be installed to a vehicle with a unibody construction.

Figure 4:
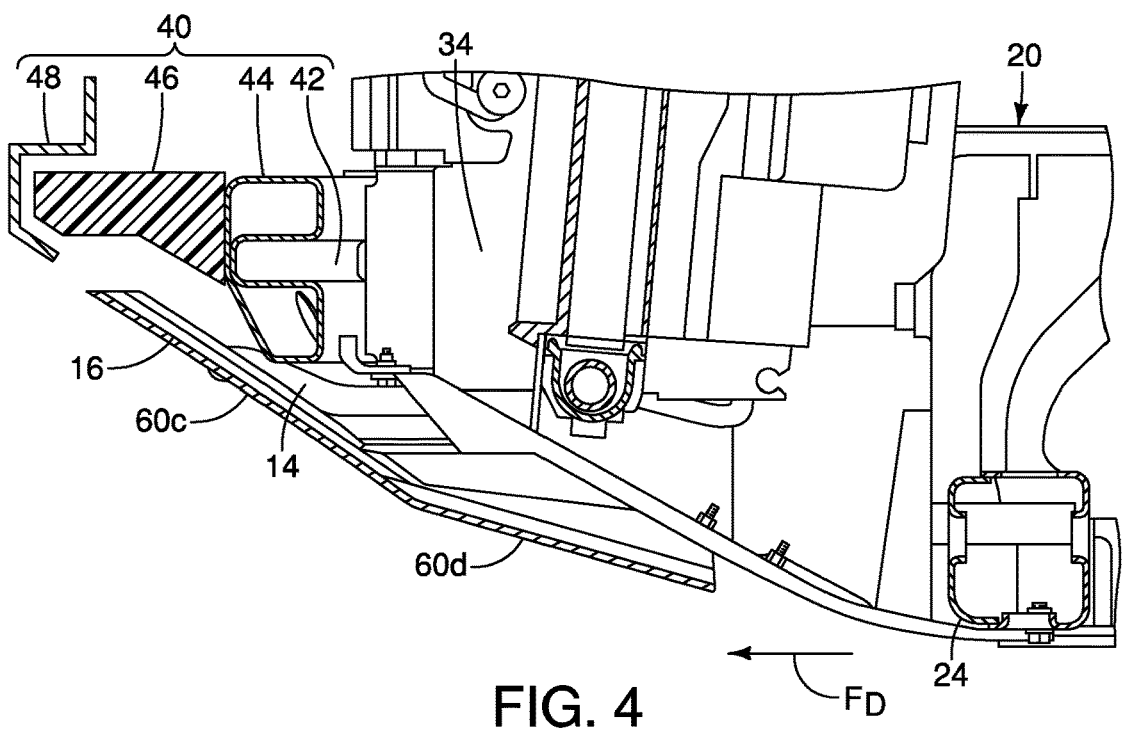
FIG. 4 is a cross-sectional view taken alone the line 4-4 in FIG. 1, showing the skid plate and a bumper assembly attached to the vehicle frame in accordance with the first embodiment.

As shown in FIGS. 2-4, a bumper assembly 40 has a first end that is attached to a forward-facing surface 34c of the front-end portion 34a of the first front side member 34. Similarly, the bumper assembly 40 has a second end that is attached to a forward-facing surface 36c of the front-end portion 36a of the second front side member 36. Further, the bumper assembly 40 extends between the forward-facing surfaces 34c and 36c of the front-end portions 34a and 36a of the first and second front side members 34 and 46.

As shown in FIG. 4, the bumper assembly 40 includes attachment brackets 42, a support bracket 44, an impact absorbing member 46 and a bumper fascia 48. Since bumper assemblies 40 are conventional vehicle structures, further description is omitted for the sake of brevity.

The first tow hook 12 and the second tow hook 14 are basically identical. Their only difference is that they are attached to different portions of the vehicle frame 18. Specifically, the tow hook 12 is installed to the downwardly facing surface 34b of the first front side member 34, and the second tow hook 14 is installed to the downwardly facing surface 36b of the second front side member 36, as described in greater detail below. Since the first tow hook 12 and the second tow hook 14 are basically the same, description of only one is provided below for the sake of brevity. However, it should be understood from the drawings and the description herein, that description of the first tow hook 12 applies equally to the second tow hook 14.

The first tow hook 12 (and the second tow hook 14) has a forward portion 50 and a rearward portion 52. The forward portion 50 has a tow hook receiving opening 50a defined therein. The rearward portion 52 has a forward opening 52a and a rearward opening 52b. The rearward opening 52b of the rearward portion 52 of the first tow hook 12 includes a narrow portion 52c and a wide portion 52d. The forward opening 52a and the rearward opening 52b are spaced apart from one another by a first distance $D_1$, as shown in FIGS. 5 and 6.

Figure 11:
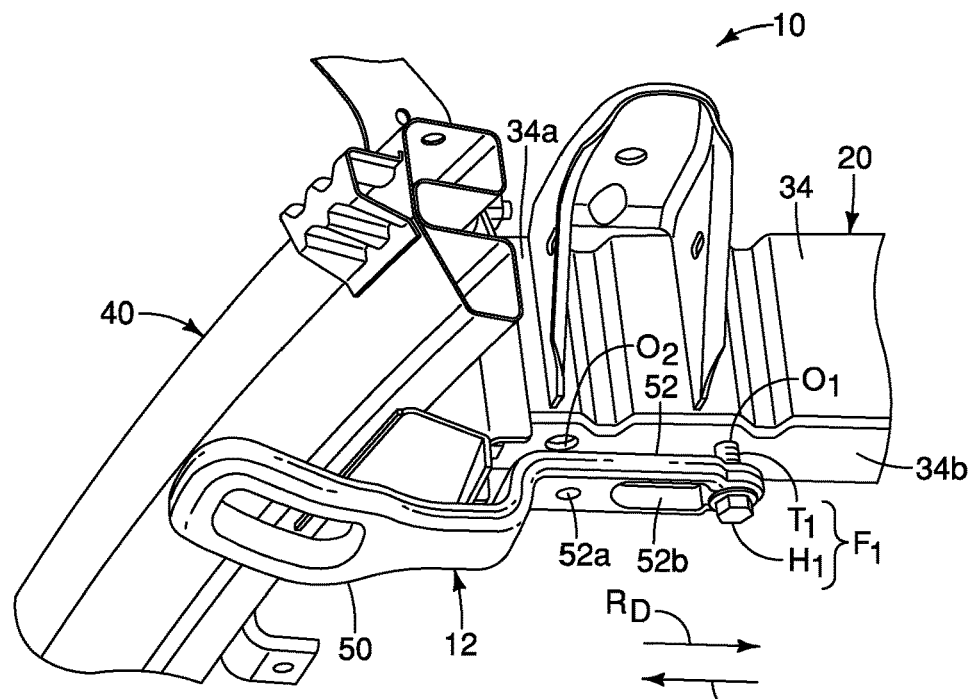
FIG. 11 is another perspective view of the portion of the front-end assembly depicted in FIG. 3 showing the first mechanical fastener partially installed to a downward facing surface of the first front side member with the first tow hook hanging from the first mechanical fastener in accordance with the first embodiment.
Figure 12:
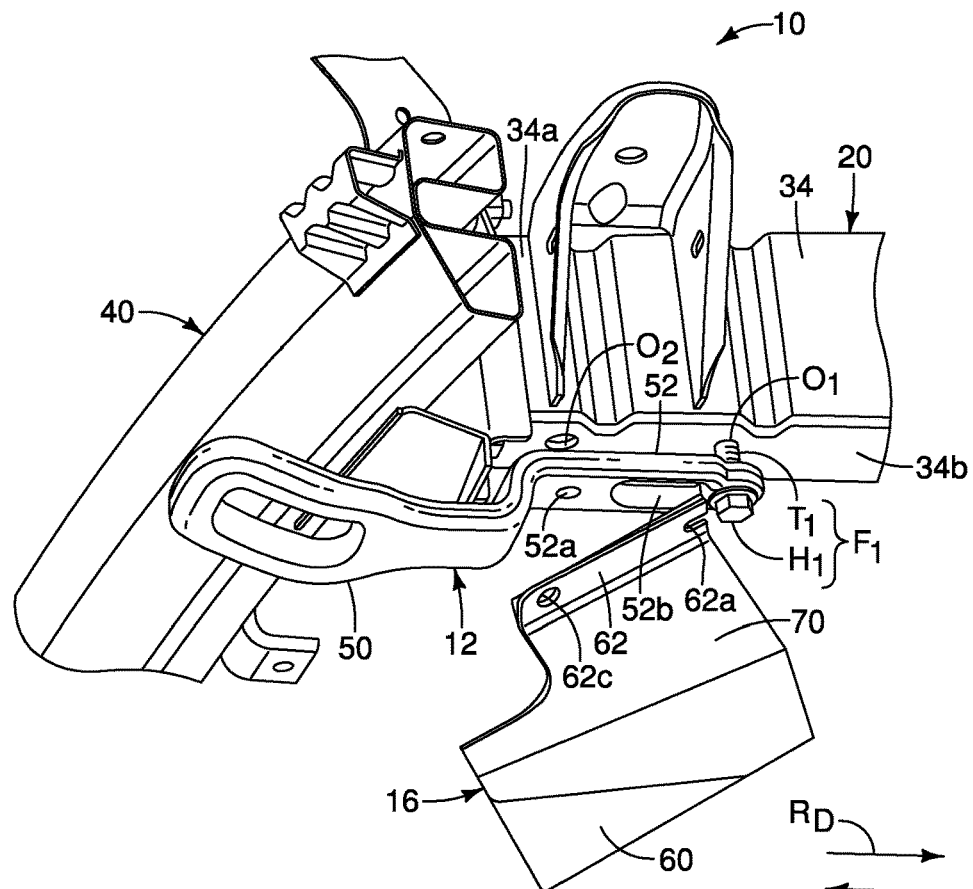
FIG. 12 is another perspective view of the portion of the front-end assembly depicted in FIGS. 3 and 11 showing the first attachment flange of the skid plate brought into position adjacent to the first mechanical fastener and brought into contacting the first tow hook in accordance with the first embodiment.

As is described further below and shown in FIGS. 5 and 6, a first mechanical fastener $F_1$ (also referred to as the first fastener $F_1$) is used to attach the first tow hook 12 to the first front side member 34. The first mechanical fastener $F_1$ has a head portion $H_1$ and a threaded portion $T_1$, as shown in FIGS. 11 and 12. The head portion $H_1$ has an overall diameter $D_2$ that is larger than an outer diameter of the threaded portion $T_1$.

Figure 5:
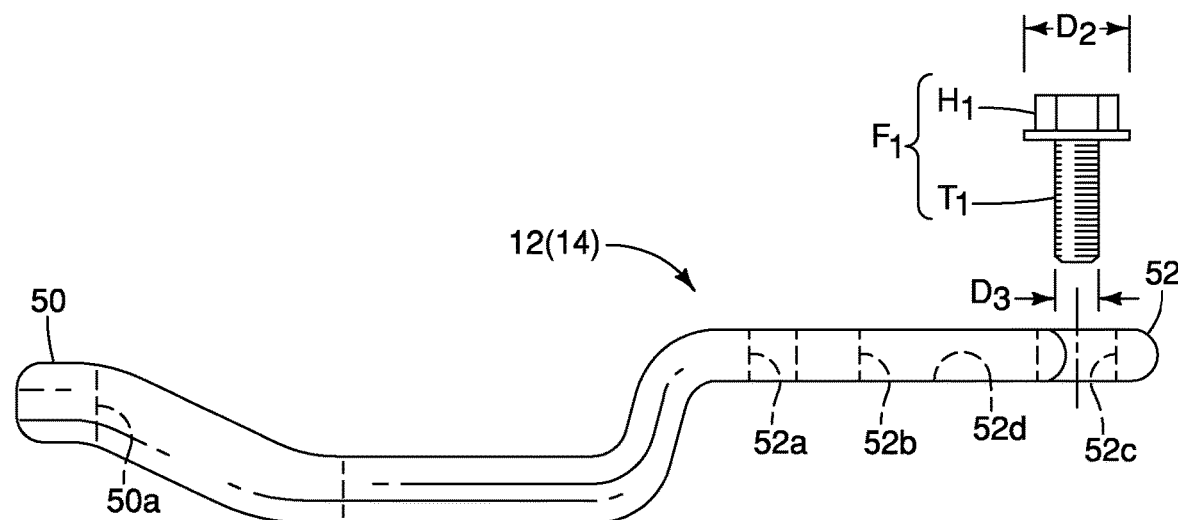
FIG. 5 is a side view of one of the first tow hook and/or the second tow hook shown removed from the vehicle in accordance with the first embodiment.
Figure 6:
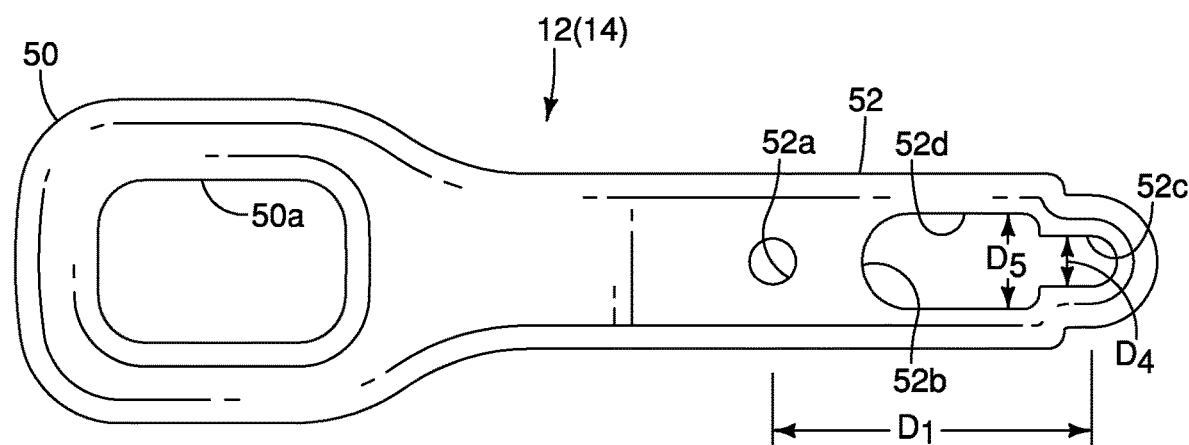
FIG. 6 is a top view of the one of the first tow hook and/or the second tow hook depicted in FIG. 5 in accordance with the first embodiment.
Figure 7:
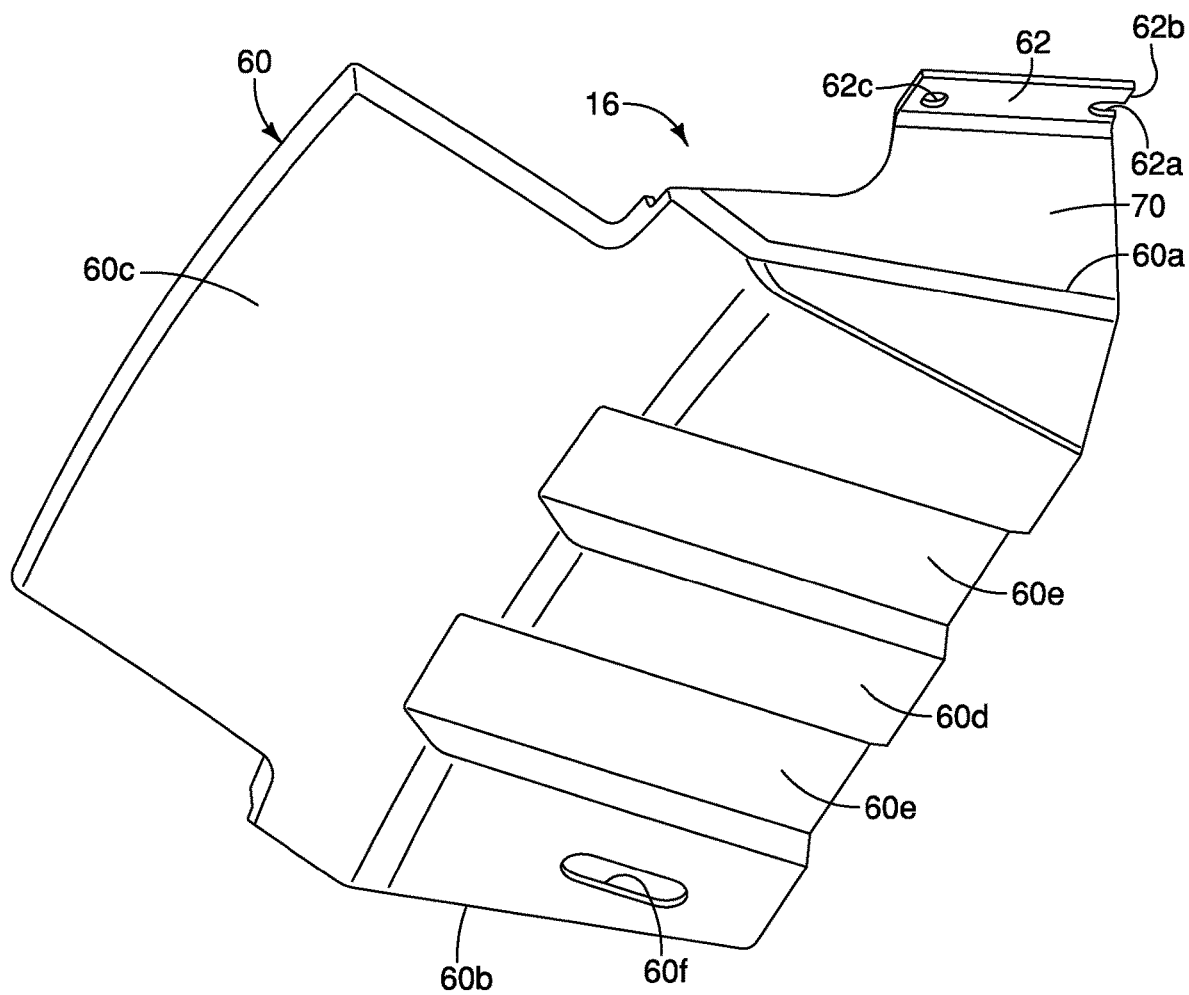
FIG. 7 is a perspective view of the skid removed from the vehicle, showing details of a main section of the skid plate and the first attachment flange in accordance with the first embodiment.

Also shown in FIGS. 5 and 6, the wide portion 52d of the rearward opening 52b is dimensioned such that the head portion $H_1$ of the first mechanical fastener $F_1$ can pass therethrough. The narrow portion 52c is dimension such that the threaded portion $T_1$ of the first mechanical fastener $F_1$ can pass therethrough with the head portion $H_1$ is prevented from passing therethrough. More specifically, the narrow portion 52e has a width $D_4$ as shown in FIG. 6. The width $D_4$ of the narrow portion 52c is approximately equal to or slightly larger (between than 2% and 5% larger) than the outer diameter $D_3$ of the threaded portion $T_1$. However, the width $D_4$ of the narrow portion 52c is approximately half of the overall diameter $D_2$ of the head portion $H_1$ of the first fastener $F_1$.

The overall diameter $D_2$ of the head portion $H_1$ is approximately equal to or slightly larger (between than 2% and 5% larger) than an overall width $D_5$ of the wide portion 52d of the rearward opening 52b. Hence, the head portion $H_1$ can easily pass through the wide portion 52d of the rearward opening 52b.

As shown in FIG. 5, the forward portion 50 and the rearward portion 52 of the first tow hook 12 (and the second tow hook 14) are not co-planar, but rather are offset from one another to provide space for the bumper assembly 40. However, it should be understood from the drawings and the description herein that the forward portion 50 and the rearward portion 52 of the first tow hook 12 (and the second tow hook 14) can alternatively be co-planar.

A description of the skid plate 16 is now provided with specific reference to FIGS. 7-10. The skid plate 16 basically includes a main section 60, a first attachment flange 62 that extends from a first lateral side 60a of the main section 60, and, a second attachment flange 64 that extends from a second lateral side 60b of the main section 60. The skid plate 16 can be manufactured from a variety of materials, such as sheet metal, aluminum panel material, plastic/polymer materials or fiberglass. The skid plate 16 is not designed as a structural element of the vehicle 10, but rather as a cover that protects the underside of a forward area of the vehicle 10. The skid plate 16 is intended to protection with sufficient strength to withstand off-road usage, and have sufficient strength to withstand repeated contact with, for example, flying debris such as stones, rocks, gravel mud or any other materials encountered during off-road usage.

The first attachment flange 62 and the second attachment flange 64 are basically identical except that they are symmetrical about the longitudinal center line $C_L$ of the vehicle 10. The second attachment flange 64 includes all the features of the first attachment flange 62. Description of the first attachment flange 62 applies equally to the second attachment flange 64. Therefore, only the first attachment flange 62 is described herein below, for the sake of brevity.

Figure 8:
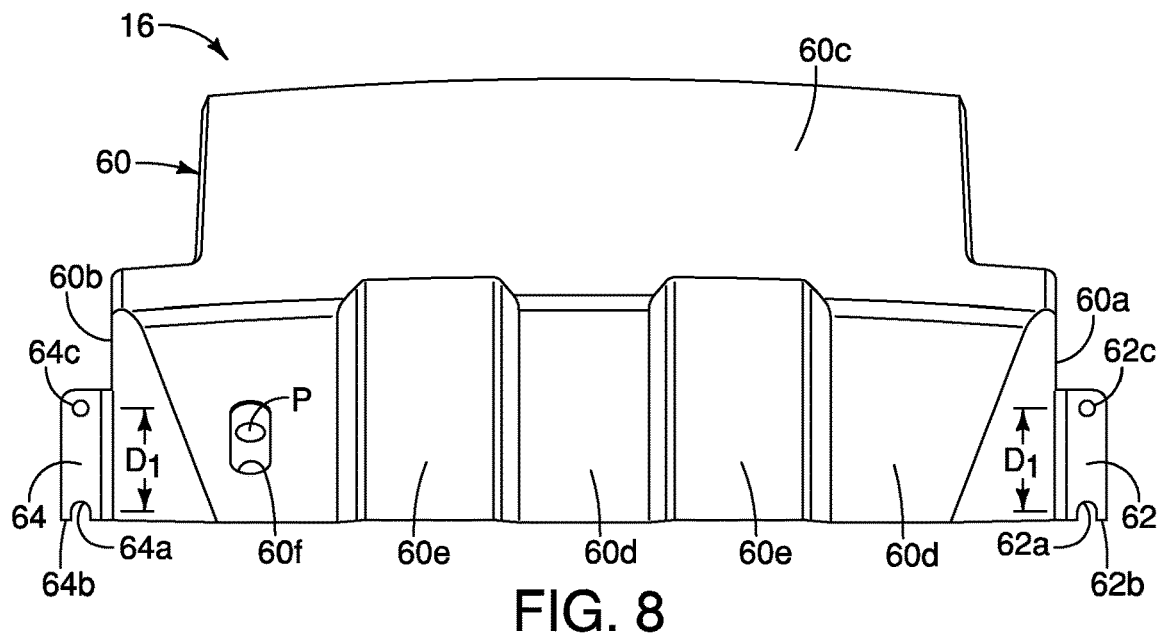
FIG. 8 is a bottom view of the skid plate showing the first attachment flange, the main section and the second attachment flange in accordance with the first embodiment.
Figure 9:
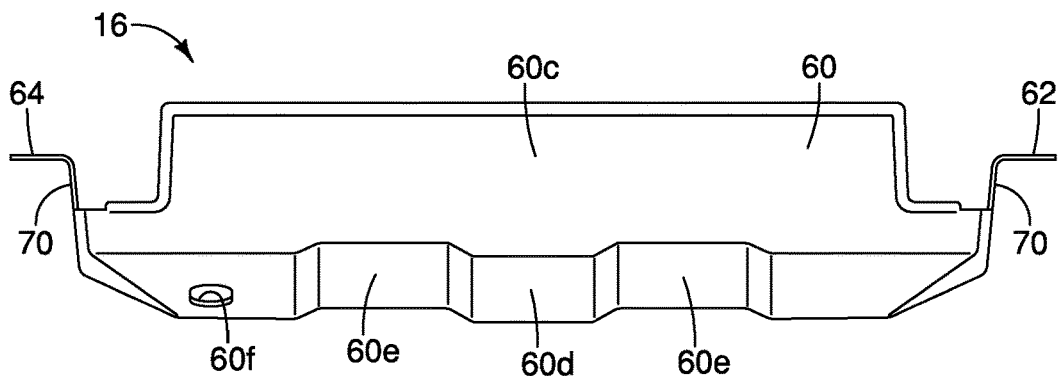
FIG. 9 is a front view of the skid plate showing the first attachment flange, the main section and the second attachment flange in accordance with the first embodiment.
Figure 10:
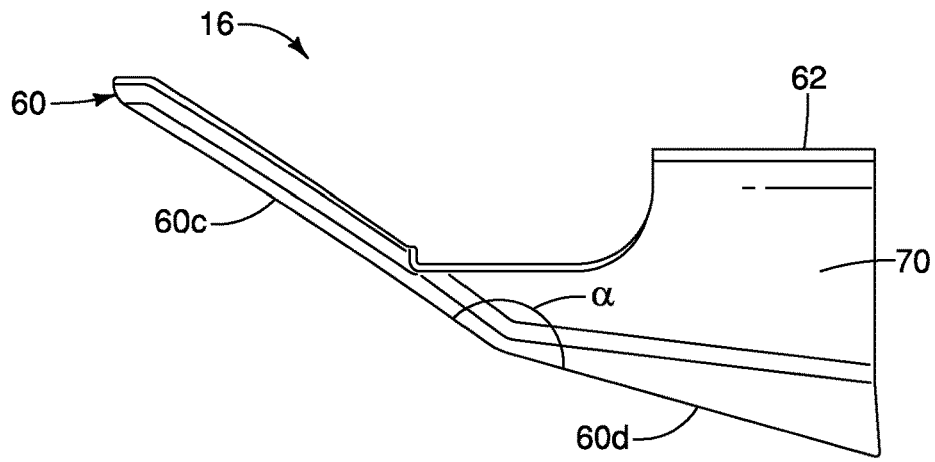
FIG. 10 is a side view of the skid plate showing the first attachment flange and the main section in accordance with the first embodiment.

The main section 60 of the skid plate 16 extends from the first attachment flange 62 to the second attachment flange 64, as shown in FIGS. 8 and 9. The main section 60 includes a first part 60c and a second part 60d that are angularly offset from one another by an obtuse angle α, as shown in FIG. 10. Depending upon the design of the vehicle 10, the obtuse angle α can be any value between 150 degrees and 170 degrees.

The first part 60c of the main section 60 is located forward of the second part 60d with the first part 60c extending upward from the second part 60d in the vehicle forward direction $F_D$, as shown in FIG. 4.

Figure 17:
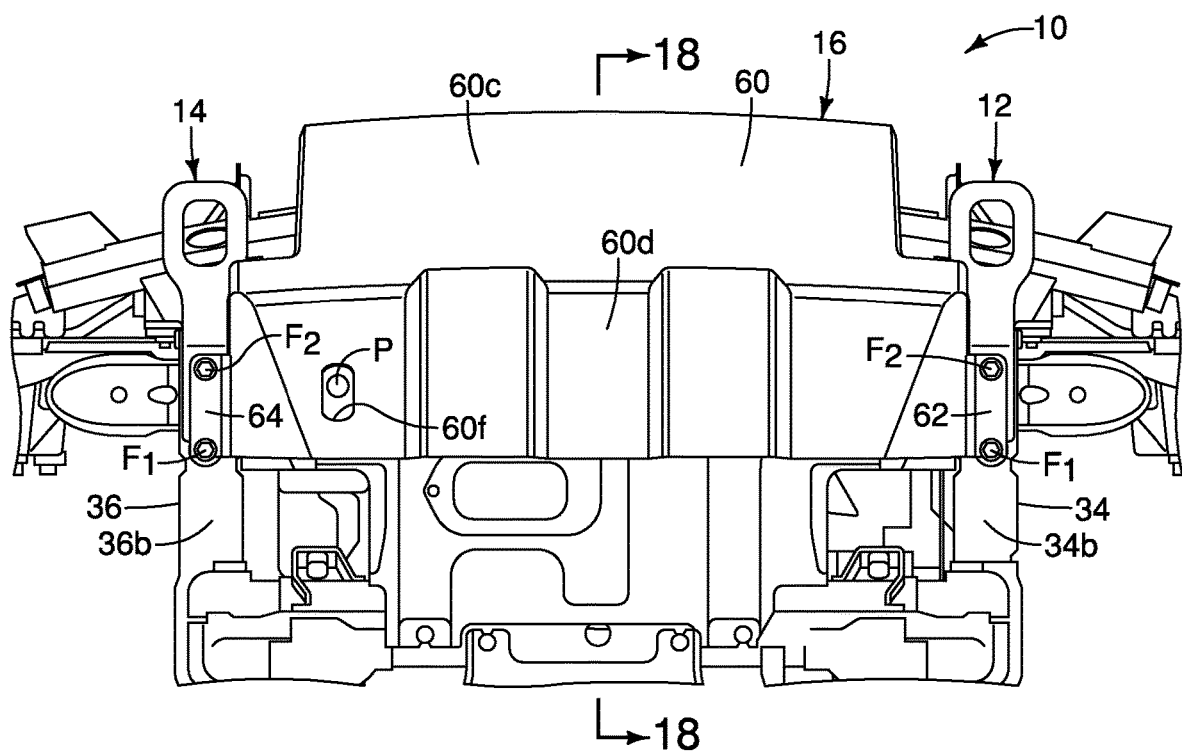
FIG. 17 is a bottom view of the vehicle and the front-end assembly showing a first pair of the first and second mechanical fasteners attaching the first tow hook and the first attachment flange of the skid plate to the first front side member, and showing a second pair of the first and second mechanical fasteners attaching the second tow hook and the second attachment flange of the skid plate to the second front side member in accordance with the first embodiment.
Figure 24:
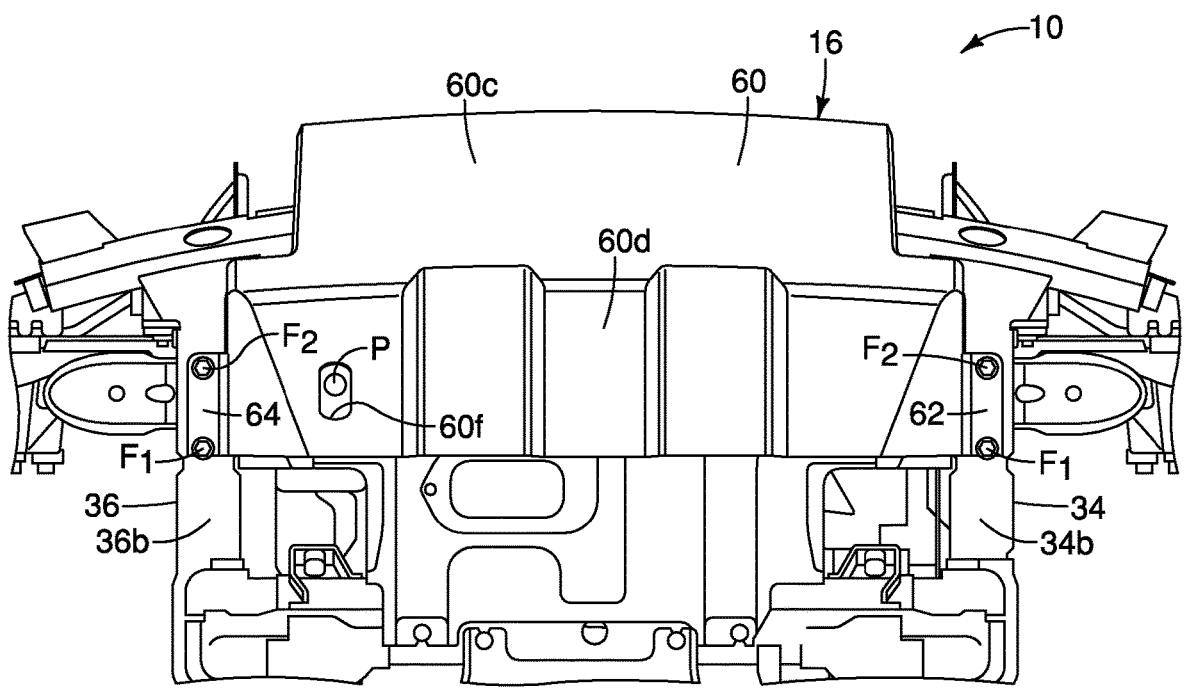
FIG. 24 is a bottom view of the vehicle and the front-end assembly showing the first pair of the first and second mechanical fasteners attaching the first attachment flange of the skid plate to the first front side member (with the first tow hook omitted), and showing a second pair of the first and second mechanical fasteners attaching second attachment flange of the skid plate to the second front side member (with the second tow hook omitted) in accordance with the first embodiment.

The first part 60c of the main section 60 is substantially planar. The second part 60d of the main section 60 includes at least one rib 60e that extends in the vehicle longitudinal direction (that coincides with the vehicle center line $C_L$). In the depicted embodiment, there are two ribs 60e. The second part 60d of the main section 60 of the skid plate 16 also includes an access opening 60f aligned with an engine element P such that the engine element P is accessible via the access opening 60f As shown in FIGS. 8, 17 and 24, the engine element P is a drain plug of an engine radiator of the vehicle 10. The main section 60 can be provided with any of a variety of dimensions. For example, the second part 60d of the main section 60 can be dimensioned to extend under only a forward portion of the engine (not shown) or can be dimensioned to extend under the area under the entire engine and transmission.

The first attachment flange 62 (and the second attachment flange 64) includes an upright extension 70 that locates the first attachment flange 62 at a location above the second part 60d of the skid plate 16 with the skid plate 16 installed to the vehicle 10. The first attachment flange 62 (and the second attachment flange 64) are basically horizontal with the vehicle 10 on a horizontal surface. The first attachment flange 62 includes a slot 62a defined along a rearward edge 62b thereof and a forward opening 62c. The slot 62a and the forward opening 62c are spaced apart from one another by the first distance $D_1$.

As shown in FIG. 8, as with the first attachment flange 64, the second attachment flange 64 has a corresponding slot 64a defined along a rearward edge 64b thereof and a forward opening 64c. The slot 64a and the forward opening 64c are spaced apart from one another by the first distance $D_1$.

A description is now provided for installation of the first tow hook 12, the second tow hook 14 and the skid plate 16 to the first front side member 34 and the second front side member 26 of the vehicle frame 18.

Figure 14:
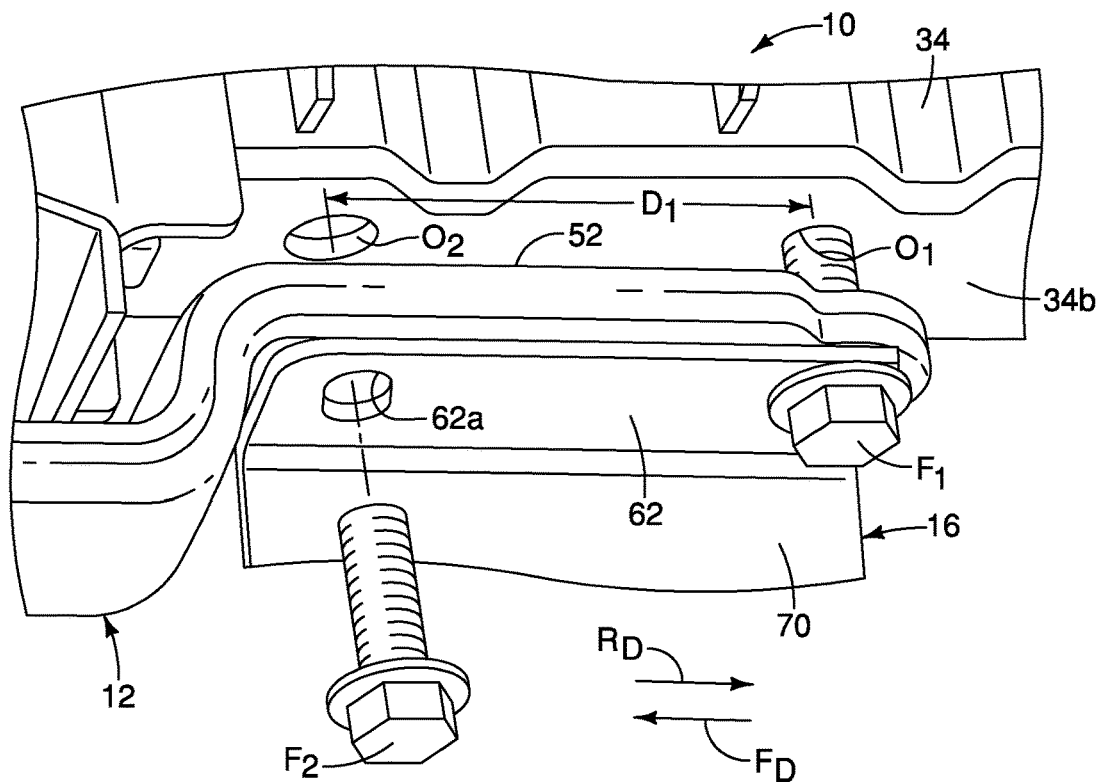
FIG. 14 is another perspective view of the portion of the front-end assembly showing the second mechanical fastener aligned with openings in the first attachment flange of the skid plate and an opening in the first tow hook during assembly thereof in accordance with the first embodiment.

As shown in FIG. 11, the downward facing surface 34b of the first front side member 34 includes a rearward opening $O_1$ and forward opening $O_2$. As shown in FIG. 14, the rearward opening $O_1$ and the forward opening $O_2$ are spaced apart from one another by the first distance $D_1$.

As shown in FIG. 1, the first fastener $F_1$ is partially threaded into the rearward opening $O_1$. Hence, a majority of the threaded portion $T_1$ of the first fastener $F_1$ is exposed below the downward facing surface 34b. With a large portion of the threaded portion $T_1$ of the first fastener $F_1$ exposed, the first tow hook 12 is hung from the first fastener $F_1$. The first tow hook 12 can be hung loosely from the first fastener $F_1$ by bringing the wide portion 52d of the first tow hook 12 up to the first fastener $F_1$. The first tow hook 12 is then pushed upward such that the head portion $H_1$ of the first fastener $F_1$ passes through the wide portion 52d of the first tow hook 12. The first tow hook 12 is then pulled in the vehicle forward direction $F_D$, such that the threaded portion $T_1$ of the first fastener $F_1$ is located now in the narrow portion 52c of the rearward opening 52b of the first tow hook 12. The rearward most areas of the first tow hook 12 contact the head portion $H_1$ of the first fastener $F_1$ allowing the first tow hook 12 to hang on the first fastener $F_1$, as shown in FIG. 11. It should be understood from the drawings and the description herein that although the first tow hook 12 is shown in a level orientation in FIGS. 11 and 12. However, gravity can pull the forward portion 50 of the first tow hook 12 downward and the first tow hook 12 can remain hanging from the first fastener $F_1$.

Figure 18:
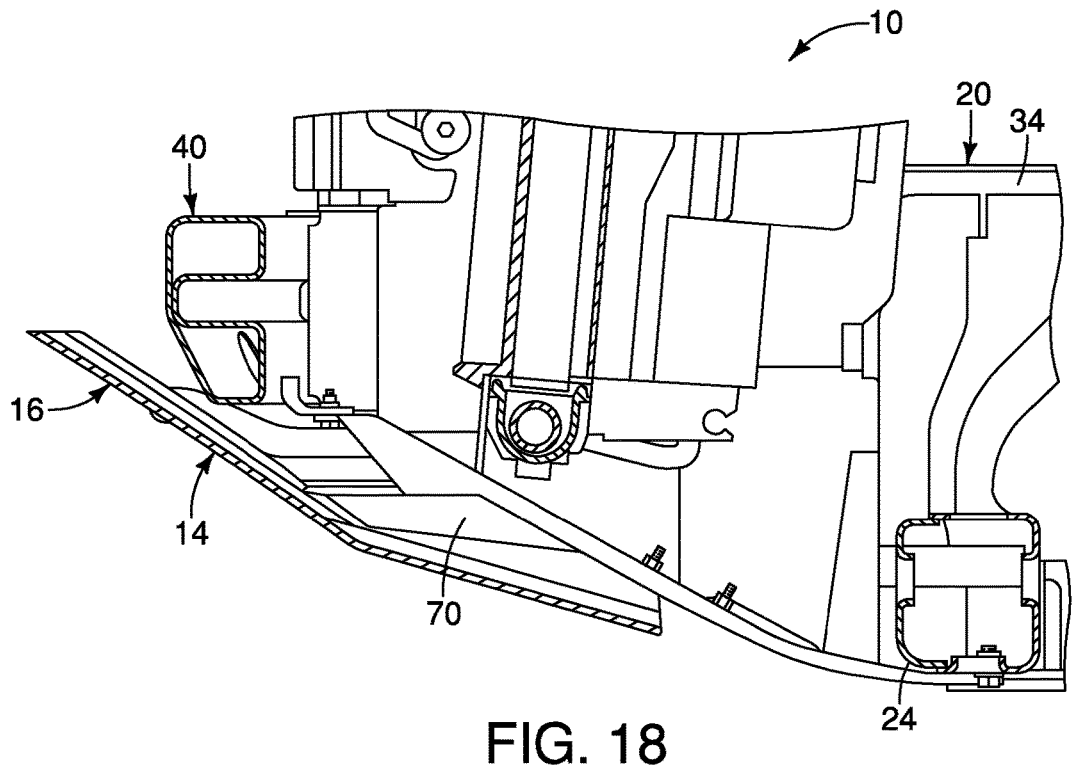
FIG. 18 is a cross-sectional view of the front-end assembly taken along the line 18-18 in FIG. 17, showing the skid plate covering a lower portion of the front end of the vehicle in accordance with the first embodiment.

The second front side member 36, being symmetrically identical to the first front side member 34, is also provided with the rearward opening $O_1$ and the forward opening $O_2$, with another one of the first fastener $F_1$ partially threaded in the rearward opening $O_1$. The second tow hook 14 is similarly hung from the first fastener $F_1$ as indicated in FIG. 18.

Figure 13:
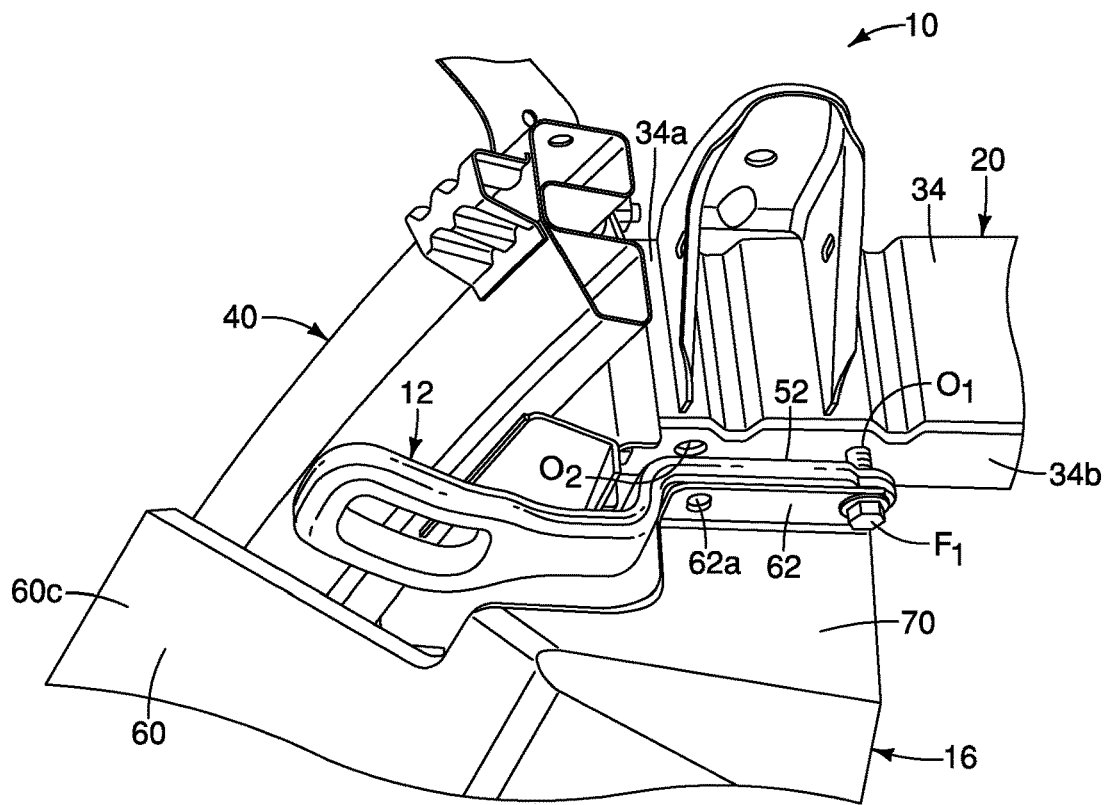
FIG. 13 is another perspective view of the portion of the front-end assembly depicted in FIGS. 3, 11 and 12 showing the first attachment flange of the skid plate moved such that the first mechanical fastener is positioned within a slot defined at a rearward edge of the skid plate and moved into alignment with the first front side member and the first tow hook in accordance with the first embodiment.

Next, the skid plate 16 is brought up to contact the first tow hook 12 (and the second tow hook 14), as shown in FIG. 12. Thereafter as shown in FIG. 13, the skid plate 16 is pushed in the vehicle rearward direction $R_D$ such that the slot 62a of the first attachment flange 62 is aligned with and receives the first fastener $F_1$ (similarly, the slot 64a shown in FIG. 8 is aligned with and receives the first fastener $F_1$ installed to the second front side member 36 as shown in FIG. 17). In other words, the skid plate 16 slid into engagement with the first fasteners $F_1$ such that the slots 62a and 64a receive a corresponding portion of their respective first fasteners $F_1$, with the first tow hook 12 located between the skid plate 16 and the first front side member 34 of the vehicle frame 18, and with the second tow hook 14 located between the skid plate 16 and the second front side member 36.

Figure 15:
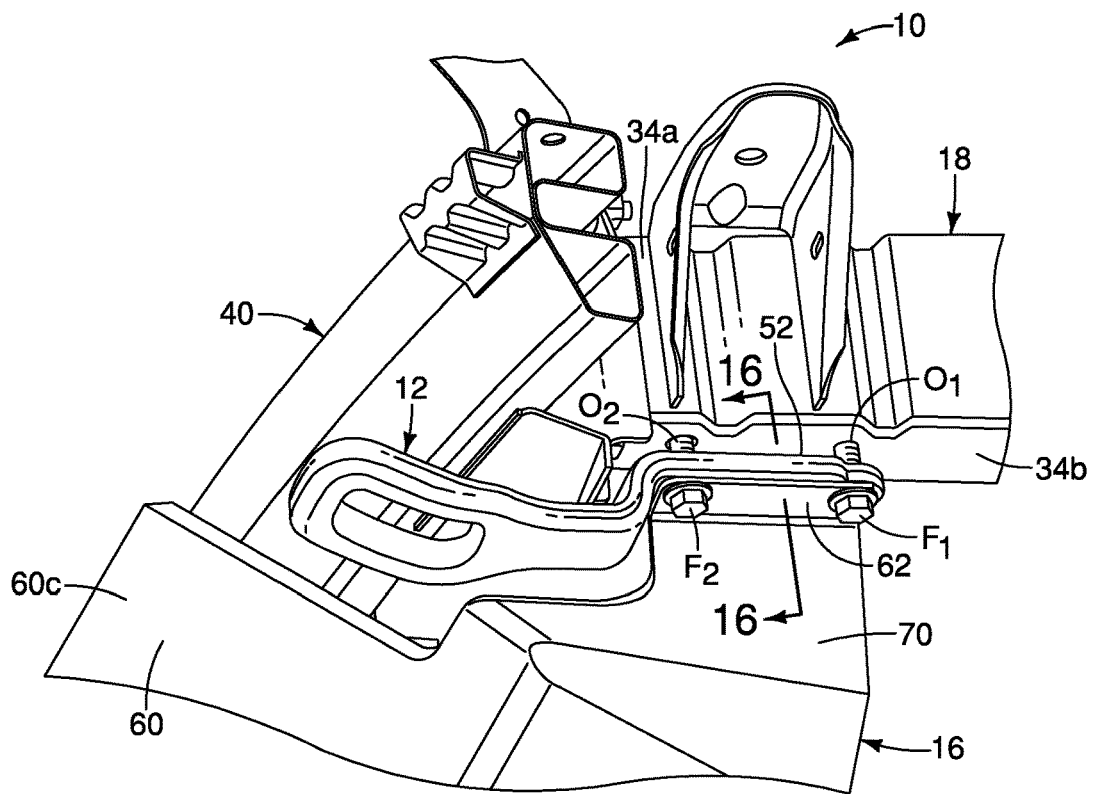
FIG. 15 is still another perspective view of the portion of the front-end assembly showing the second mechanical fastener installed but not yet tightened holding the first attachment flange of the skid plate and the first tow book in alignment with one another during assembly thereof in accordance with the first embodiment.
Figure 16:
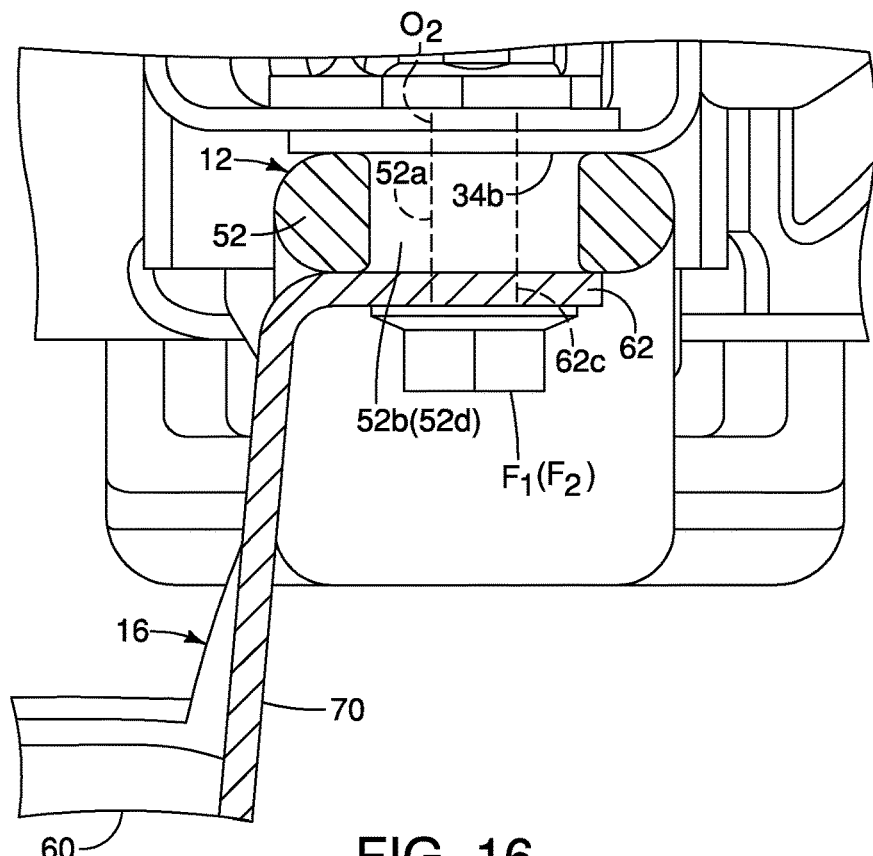
FIG. 16 is a cross-sectional view of the front-end assembly taken along the line 16-16 in FIG. 15 showing the first and second mechanical fasteners tightened, clamping and sandwiching the first tow hook between the first front side member and the first attachment flange of the skid plate in accordance with the first embodiment.

Thereafter as shown in FIGS. 14 and 15, second mechanical fasteners $F_2$ (also referred to as second fasteners $F_2$) are attached to the vehicle frame 18 as follows. One of the second listeners $F_2$ (as shown in FIGS. 14 and 15) is inserted through the opening 62a in the first attachment flange 62 of the skid plate 18, through the forward opening 50 of the first tow hook 12, and into the forward fastener opening $O_2$ of the first front side member 34 of the frame 18. Similarly, the other of the second fasteners $F_2$ (as shown in FIG. 17) is inserted through the opening 64a in the second attachment flange 64 of the skid plate 18, through the forward opening 50 of the second tow hook 14, and into the forward fastener opening $O_2$ of the second front side member 36 of the frame 18. Thereafter, the first fasteners $F_1$ and the second fasteners $F_2$ are tightened, securing the first and second tow hooks 12 and 14, and the skid plate 16 to the vehicle frame 18, and shown in FIG. 16. More specifically, tightening the first fasteners $F_1$ and the second fasteners $F_2$ clamps the first and second tow hooks 12 and 14 between the vehicle frame 18 and the skid plate 16.

As mentioned above, the openings $O_1$ and $O_2$ are spaced apart from one another by the first distance $D_1$; the forward opening 52a and the narrow portion 52c of the rearward opening 52b are spaced apart from one another by the first distance $D_1$; and the slots 62a and 64a are spaced apart from corresponding ones of the forward openings 62c and 64c by the first distance $D_1$. Hence, the openings $O_1$, the narrow portions 52c of the rearward openings 52b and respective slots 62a and 64a align with one another once the first fasteners $F_1$ installed. Similarly, the openings $O_2$, the forward openings 52a and corresponding forward opening 62c and 64c are aligned with the first fasteners $F_1$ and the second fasteners $F_2$ installed. Hence, the insertion and tightening of the second fasteners $F_2$ ensures proper alignment of the first and second tow hooks 12 and 14, and the skid plate 16 with the first and second front side members 34 and 36.

Hence, the attachment points for the first and second tow hooks 12 and 14 are the same attachment points for the skid plate 16, where the attachment points are defined by the respective openings $O_1$ and $O_2$ of the first and second front side members 34 and 36 (the installation locations of the first and second fasteners $F_1$ and $F_2$).

FIGS. 11-16 depict attachment of the first tow hook 12 and the first attachment flange 62 of the skid plate 16 to first front side member 34 via the installation of the first and second fasteners $F_1$ and $F_2$. It should be understood from the drawings and the description herein that depiction of attachment of the second tow hook 14 and the second attachment flange 64 of the skid plate 16 to second front side member 36 with corresponding ones of the first and second fasteners $F_1$ and $F_2$ is identical to the depiction in FIGS. 11-16, except that the depictions would be mirror images of FIG. 11-16. FIG. 17 shows the first and second tow hooks 12 and 14 and the skid plate 16 installed to the first and second front side members 34 and 36.

As described above, the first front side member 34 and the second front side member 36 area laterally spaced apart from one another. The first attachment flange 62 and the second attachment flange 64 are spaced apart from one another by a distance equal to the distance between the first front side member 34 and the second front side member 36.

In the first embodiment, and each of the following embodiments, the skid plate 16 is only attached to the vehicle 10 and vehicle frame 18 by the first attachment flange 62 and the second attachment flange 64. In other words, the main section 60 and the upright extensions 70 extend between the first attachment flange 62 and the second attachment flange 64 and are attached to the vehicle frame 18 only via the first attachment flange 62 and the second attachment flange 64. The main section 60 of the skid plate 16 has no attachments points of its own relative to the vehicle frame 18 and the remainder of the vehicle 10 other that attachment via the first attachment flange 62 and the second attachment flange 64.

Second Embodiment

Figure 19:
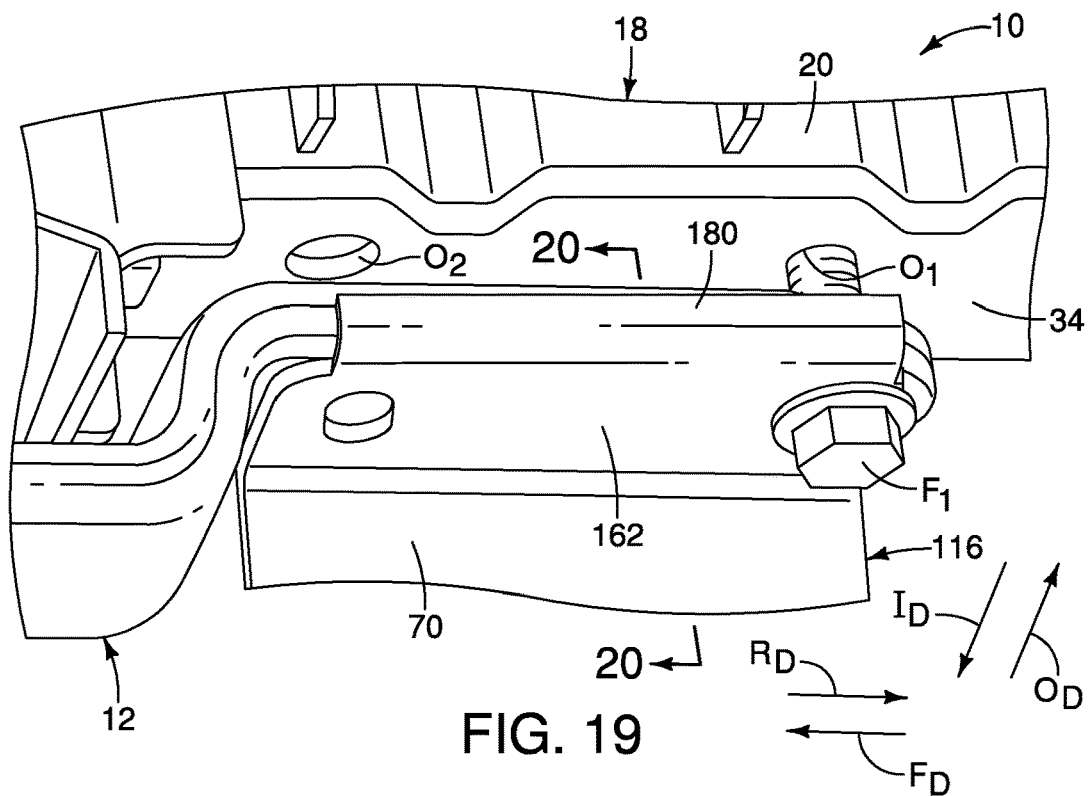
FIG. 19 is a perspective view of a front-end assembly showing a first attachment flange with an upwardly extending alignment projection in accordance with a second embodiment.
Figure 20:
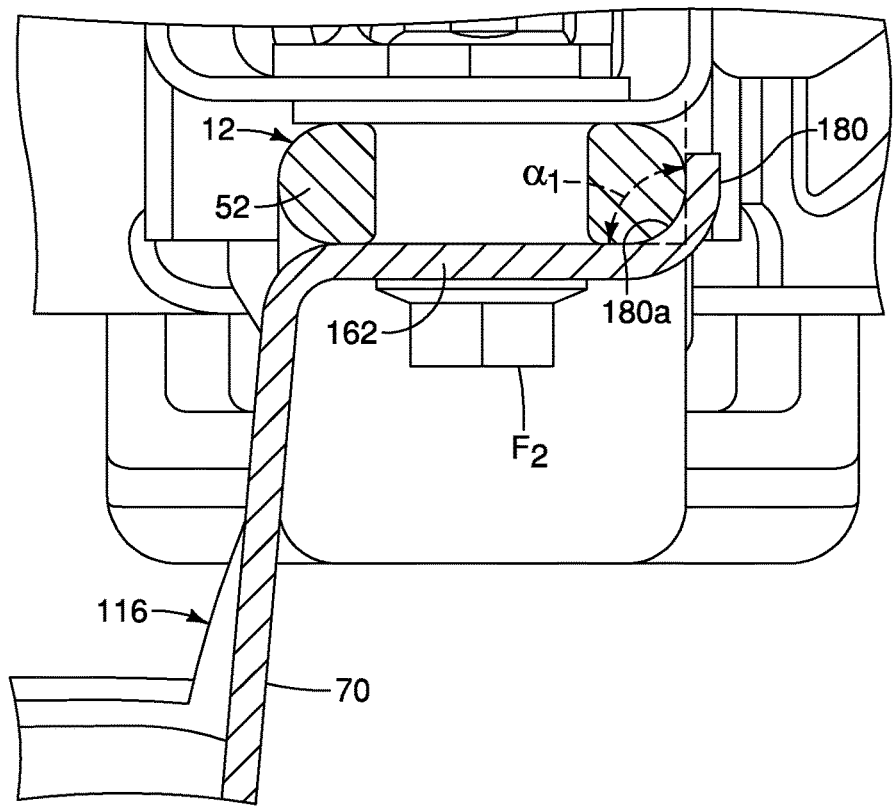
FIG. 20 is a cross-sectional view of the front-end assembly similar to FIG. 16, showing the upwardly extending alignment projection of the first attachment flange with an alignment surface contacting an outboard portion of the first tow hook aligning the first tow hook with the first attachment flange and the first front side member in accordance with the second embodiment.

Referring now to FIGS. 19-20, a first attachment flange 162 of a skid plate 116 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The skid plate 116 is identical to the skid plate 16 of the first embodiment and includes all of the features of the skid plate 16 of the first embodiment, except that the first attachment flange 162 is modified, as compared to the first attachment flange 62 of the first embodiment. Specifically, the first attachment flange 162 has been modified to include an upwardly extending alignment projection 180. The alignment protection 180 has an arcuate shape, as shown in cross-section in FIG. 20. The alignment projection 180 extends from an outboard lateral side of the first attachment flange 162. The alignment projection 180 defines an alignment surface 180a formed thereon. The alignment surface 180a (shown in FIG. 20) is shaped to contact an outboard lateral side of the rearward portion 52 of the first tow hook 12. The skid plate 116 attaches to the first front side member 34 via the first and second fasteners $F_1$ and $F_2$ as described above with respect to the first embodiment, except that the alignment surface 180a contacts the first tow hook 12 keeping it in alignment with the first attachment flange 162 and consequently with the first front side member 34 during installation. More specifically, during installation of the skid plate 116 to the first front side member 34, the alignment projection 180 contacts the surface of the rearward portion 52 of the first tow hook 12 moving the first tow hook 12 into alignment with the first attachment flange 162 and the first front side member 34.

As shown in FIG. 20, the first attachment flange 162 is planar and defines an first plane (dashed line in FIG. 20), and, the alignment surface 180a extends upward from the first attachment flange 162 such that an end portion of the alignment surface 180a defines a second plane (dashed line in FIG. 20), where the first plane and the second plane define an angle $\alpha_1$ that is a value anywhere between 20 degrees and 90 degrees. However, in the depicted second embodiment, the angle $\alpha_1$ is, for example, approximately 90±5 degrees.

It should be understood from the drawings and the description herein that a second attachment flange (not shown) of the skid plate 116 can also be provided with an alignment projection identical (but a mirror image of) the alignment projection 180 in order to align the second tow hook 14. A depiction of the second attachment flange and corresponding alignment projection would be identical to, but mirror images of the depictions in FIGS. 19 and 20.

Third Embodiment

Figure 21:
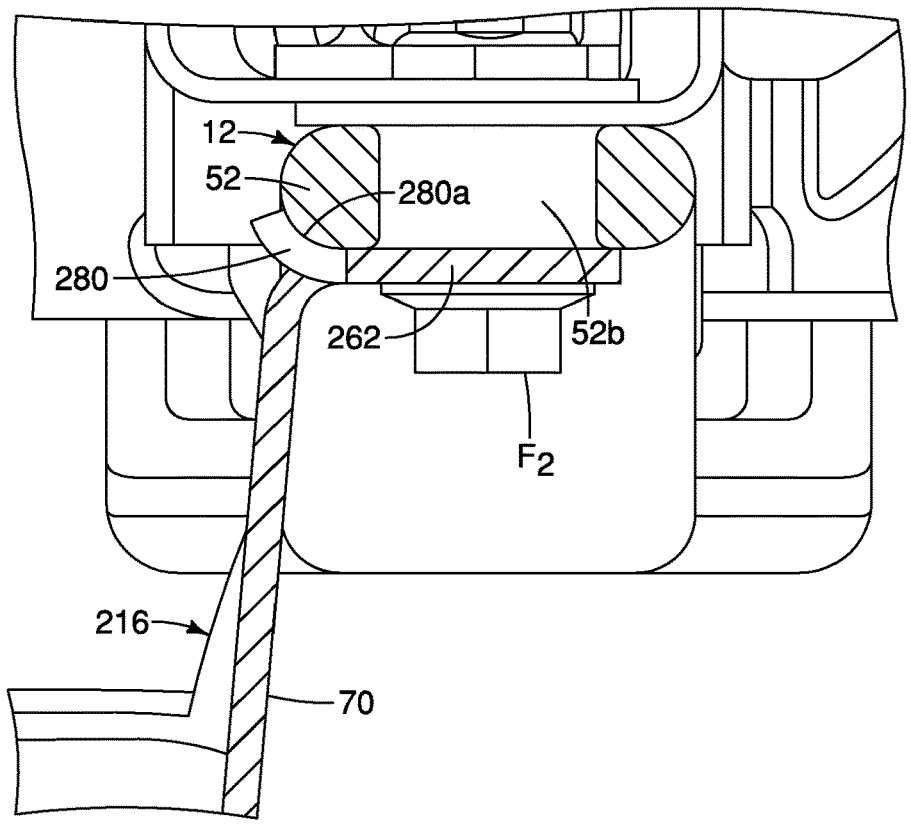
FIG. 21 is another cross-sectional view of a front-end assembly similar to FIG. 20, showing an upwardly extending alignment projection of a first attachment flange with an alignment surface of the alignment projection contacting an inboard portion of the first tow hook aligning the first tow hook with the first attachment flange and the first front side member in accordance with a third embodiment.

Referring now to FIG. 21, a first attachment flange 262 of a skid plate 216 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The skid plate 216 is identical to the skid plate 16 of the first embodiment and includes all of the features of the skid plate 16 of the first embodiment, except that the first attachment flange 262 is modified, as compared to the first attachment flange 62 of the first embodiment. Specifically, the first attachment flange 262 has been modified to include an upwardly extending alignment projection 280. The alignment projection 280 has an arcuate shape, as shown in cross-section in FIG. 21. The alignment projection 280 extends from an inboard lateral side of the first attachment flange 262. The alignment projection 280 defines an alignment surface 280a formed thereon. The alignment surface 280a is shaped to contact an inboard lateral side of the rearward portion 52 of the first tow hook 12. The skid plate 216 attaches to the first front side member 34 via the first and second fasteners $F_1$ and $F_2$ as described above with respect to the first embodiment, except that the alignment surface 280a contacts the first tow hook 12 keeping it in alignment with the first attachment flange 262 and consequently with the first front side member 34 during installation. More specifically, during installation of the skid plate 216 to the first front side member 34, the alignment projection 280 contacts the surface of the rearward portion 52 of the first tow hook 12 moving the first tow hook 12 into alignment with the first attachment flange 162 and the first front side member 34.

As shown in FIG. 21, the first attachment flange 262 is planar and the alignment surface 280a extends upward from the first attachment flange 262 such that an end portion of the alignment surface 280a and the first attachment flange 262 define angle therebetween that is between 20 and 90 degrees. However, in the third embodiment the angle is, for example, approximately 45±5 degrees.

It should be understood from the drawings and the description herein that a second attachment flange (not shown) of the skid plate 216 can also be provided with an alignment projection identical (but a mirror image of) the alignment projection 280 in order to align the second tow hook 14. A depiction of the second attachment flange and corresponding alignment projection would be identical to, but mirror images of the depiction in FIG. 21.

Fourth Embodiment

Figure 22:
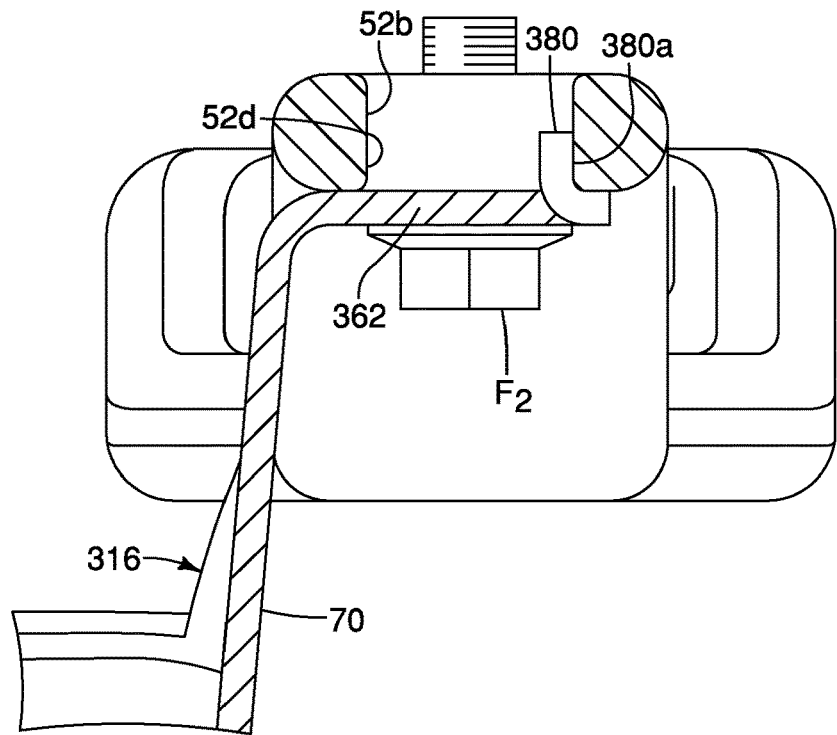
FIG. 22 is a cross-sectional view of a front-end assembly similar to FIG. 21, showing an upwardly extending alignment projection of a first attachment flange with an alignment surface of the alignment projection contacting a surface of an attachment opening defined within a first tow hook aligning the first tow hook with the first attachment, flange and the first front side member in accordance with a fourth embodiment.

Referring now to FIG. 22, a first attachment flange 362 of a skid plate 316 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The skid plate 316 is identical to the skid plate 16 of the first embodiment and includes all of the features of the skid plate 16 of the first embodiment, except that the first attachment flange 362 is modified, as compared to the first attachment flange 62 of the first embodiment. Specifically, the first attachment flange 362 has been modified to include an upwardly extending alignment projection 380. The alignment projection 380 has an arcuate shape, as shown in cross-section in FIG. 22. The alignment projection 380 extends from an outboard lateral side of the first attachment flange 362, but, extends upwardly therefrom in an inboard direction. The alignment projection 380 defines an alignment surface 380a formed thereon. The alignment surface 380a is shaped and located to contact a surface within the rearward opening 52b of the rearward portion 52 of the first tow hook 12. The skid plate 316 attaches to the first front side member 34 via the first and second fasteners $F_1$ and $F_2$ as described above with respect to the first embodiment, except that the alignment surface 380a contacts the first tow hook 12 keeping it in alignment with the first attachment flange 362 and consequently with the first front side member 34 during installation. More specifically, during installation of the skid plate 316 to the first front side member 34, the alignment projection 380 contacts the surface within the rearward opening 52b of the rearward portion 52 of the first tow hook 12 moving the first tow hook 12 into alignment with the first attachment flange 362 and the first front side member 34.

As shown in FIG. 20, the first attachment flange 362 is planar and the alignment surface 380a extends upward from the first attachment flange 362 such that an end portion of the alignment surface 380a and the first attachment flange 362 define angle therebetween that is between 20 and 90 degrees. However, in the fourth embodiment the angle is, for example, approximately 90±5 degrees.

It should be understood from the drawings and the description herein that a second attachment flange (not shown) of the skid plate 316 can also be provided with an alignment projection identical (but a mirror image of) the alignment projection 380 in order to align the second tow hook 14. A depiction of the second attachment flange and corresponding alignment projection would be identical to, but mirror images of the depiction in FIG. 22.

Fifth Embodiment

Figure 23:
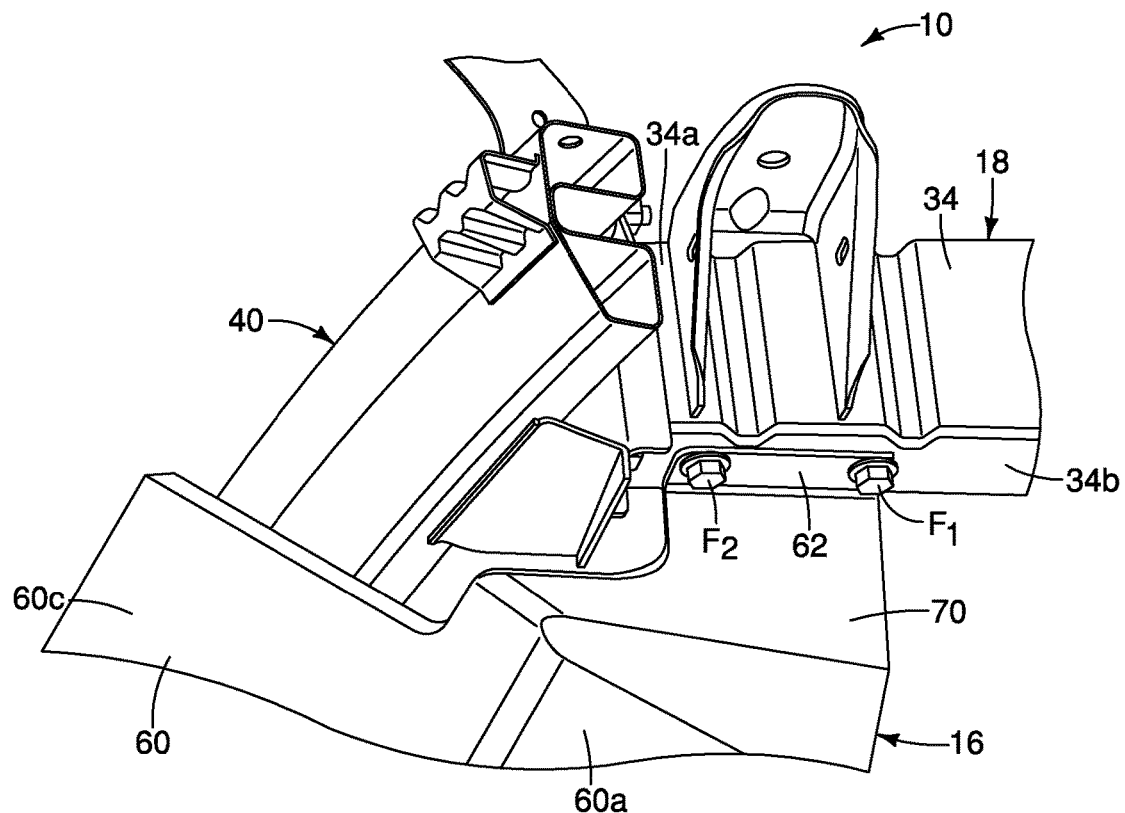
FIG. 23 is a perspective view of a portion of the front-end assembly fully assembled showing the first front side member and the first attachment flange of the skid plate fixed together by the first mechanical fastener and the second mechanical fastener in the absence of a first tow hook and a second tow hook (the first and second tow hooks being omitted) in accordance with a fifth embodiment.

Referring now to FIGS. 23 and 24, the vehicle 10 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The vehicle 10 includes the vehicle frame 18 with first and second front side members 34 and 36 and the skid plate 16, as described above with respect to the first embodiment.

The vehicle 10 has been modified in the fifth embodiment such that the first and second tow hooks 12 and 14 are omitted. Consequently, the first attachment flange 62 and the second attachment flange 64 attach directly to corresponding ones of the downward facing surfaces 34b and 36c of the first and second front side members 34 and 36. In other words, the first attachment flange 62 and the second attachment flange 64 directly contact and are fixed to corresponding ones of the downward facing surfaces 34b and 36c of the first and second front side members 34 and 36 via the first and second fastener $F_1$ and $F_2$. As shown in FIG. 24, the access opening 60f aligns with the engine element P (a drain plug of the engine radiator of the vehicle 10).

Otherwise, the vehicle 10 is as described above with respect to the first embodiment.

The various components and features of the vehicle 10 other than the first and second tow hooks 12 and 14, and the skid plate 16, are conventional components that are well known in the art. Since these other components and features of the vehicle 10 are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the front-end assembly. Accordingly, these terms, as utilized to describe the present invention should be interpreted relative to a vehicle equipped with the front-end assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front-end assembly, comprising
a vehicle frame having a first front side member and a second front side member laterally spaced apart from one another, each of the first and second front side members having a corresponding front-end portion with a forward facing surface and a downward facing surface;

a bumper assembly being attached to and extending between the forward-facing surfaces of the front-end portions of the first and second front side members; and a skid plate having a main section, a first attachment flange extending from a first lateral side of the main section and a second attachment flange extending from a second lateral side of the main section, the first attachment flange being attached to the downward facing surface of the first front side member, and the second attachment flange being attached to the downward facing surface of the second front side member such that the main section covers a forward area of an underside of the vehicle.

2. The vehicle front-end assembly according to claim 1, wherein with the skid plate installed to the vehicle frame, the first attachment flange of the skid plate directly contacts the downward facing surface of the first front side member, and the second attachment flange of the skid plate directly contacts the downward facing surface of the second front side member.

3. The vehicle front-end assembly according to claim 1, wherein each of the first attachment flange and the second attachment flange of the skid plate includes a slot defined along a rearward edge thereof and a forward opening, the slot and the forward opening of the first attachment flange being spaced apart from one another by a first distance.

4. The vehicle front-end assembly according to claim 3, wherein the downward facing surface of the front-end portion of the first front side member includes a rear fastener receiving opening and a forward fastener receiving opening spaced apart from one another by the first distance.

5. The vehicle front-end assembly according to claim 4, wherein the slot of the first attachment flange receives a first mechanical fastener extending therethrough, the first mechanical fastener further extending through the rear fastener receiving opening of the downward facing surface of the front-end portion of the first front side member, and the forward opening of the first attachment flange receiving a second mechanical fastener extending therethrough, the second mechanical fastener further extending through the forward fastener receiving opening defined in the downward facing surface of the front-end portion of the first front side member such that tightening of the first and second mechanical fasteners urges the first attachment flange toward the downward facing surface of the first front side member.

6. The vehicle front-end assembly according to claim 3, wherein the first front side member and the second front side member are spaced apart from one another by a second distance, and the first attachment flange and the second attachment flange are also spaced apart from one another by the second distance, and the main section of the skid plate extends from the first attachment flange to the second attachment flange.

7. The vehicle front-end assembly according to claim 1, wherein the main section includes a first part and a second part that are angularly offset from one another by an obtuse angle.

8. The vehicle front-end assembly according to claim 1, wherein the obtuse angle is between 150 degrees and 170 degrees.

9. The vehicle front-end assembly according to claim 7, wherein the first part of the main section is located forward of the second part, with the first part extending upward from the second part in a vehicle forward direction.

10. The vehicle front-end assembly according to claim 9, wherein the second part of the main section of the skid plate includes at least one rib that extends in the vehicle forward direction.

11. The vehicle front-end assembly according to claim 10, wherein the second part of the main section of the skid plate includes an access opening aligned with an engine element such that the engine element is accessible via the access opening.

12. The vehicle front-end assembly according to claim 11, wherein the first part of the main section is substantially planar.

13. The vehicle front-end assembly according to claim 12, wherein the first attachment flange extends upward from the first lateral side of the second part of the main section and the second attachment flange extends upward from the second lateral side of the second part of the main section.

14. The vehicle front-end assembly according to claim 1, wherein the main section of the skid plate extends from the first attachment flange to the second attachment flange.

* * * * *